Aug. 18, 1936.  H. W. POYNTER  2,051,742
RAILWAY SAFETY AUTOMATIC TRACK DEVICE
Filed Jan. 11, 1935
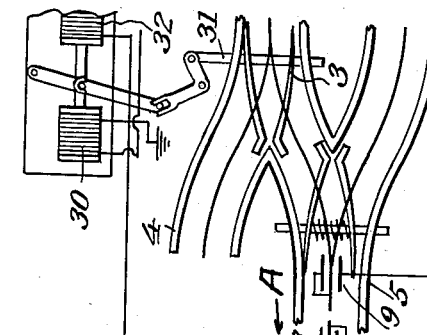
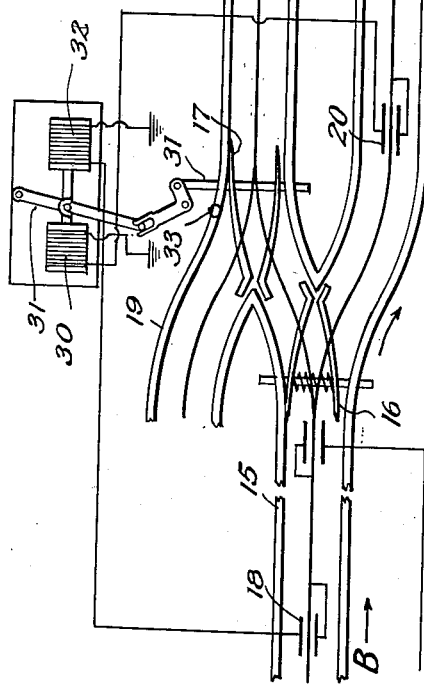
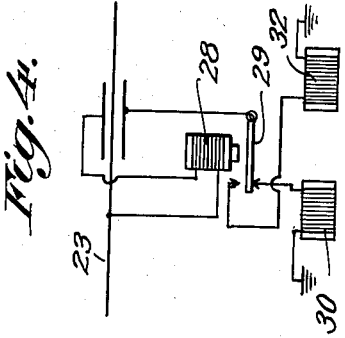
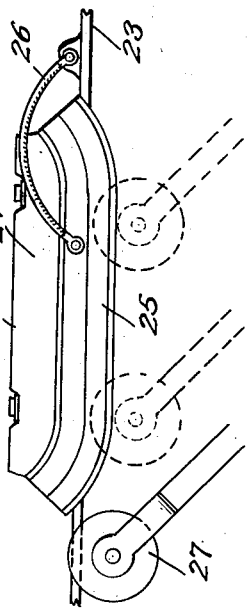
Henson W. Poynter
INVENTOR
BY Victor J. Evans & Co.
ATTORNEYS Patented Aug. 18, 1936

2,051,742

UNITED STATES PATENT OFFICE 2,051,742

RAILWAY SAFETY AUTOMATIC TRACK DEVICE

Henson W. Poynter, Clarksburg, W. Va.

Application January 11, 1935, Serial No. 1,409

5 Claims. (Cl. 246—219)

This invention relates to railway safety automatic track devices.

An object of the invention is to provide electrically operated switches in combination with safety spur tracks in a passing siding whereby headon collisions are prevented by the shunting of a vehicle such as an electric car or a train from the passing siding into the safety spur track, the switches being under control of the motorman of a train approaching the passing siding.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a diagrammatic view showing double track sections forming passing sidings, electrically operated switches, safety spur tracks, and electrical means under control of the motorman for operating the switches.

Figure 2 is a side elevation of one of the contactors on the trolley line.

Figure 3 is a cross sectional view of the contactor.

Figure 4 is a diagrammatic view showing the electrical devices for operating the switches by the motorman pulling through.

Referring now to the drawing in which like characters of reference designate similar parts in the various views, 5 designates a section of single track joining two double track sections 6 and 7, the latter forming passing sidings. A switch 8, of the spring type, is disposed at one end of the single track section and is adapted to guide all vehicles from the single track section onto one track, 6 for example, of the adjacent double track section or siding, but permits vehicles from either track of the double track section to enter the single track section.

An electrically operated tongue switch 11 in the other track, for example, 7, of the double track section or passing siding, is disposed adjacent the switch 8, and is adapted to selectively control the passage of the vehicle from the siding onto the main line, or the passage of a vehicle from the sliding onto a safety spur track 12.

A vehicle operated electric contact 9 is disposed in the single track 5 at the station A and is adapted to control the electrically operated switch 11 to its open position to shunt vehicles attempting to leave the track 7 of the double track section into the safety spur track 12 so that a vehicle will not be permitted to pass from the track 7 onto the single track 5 until the vehicle progressing along the single track from the station A in the direction of the arrowhead, toward the switch 8, has entered the track 6 of the siding.

A second vehicle operated electric contact 13 is disposed on the track 6 of the double track section and is adapted to control the electrically operated switch 11 to closed position so that a vehicle on the track 7 may leave the track 7 and proceed onto the single track 5 in the direction of the station A after the vehicle traveling from the station A has entered the track 6 of the double track section or passing siding.

The same apparatus just described is duplicated at the juncture of the opposite end of the double track section or passing siding with the single track 15. As previously described, a switch 16 of the spring type, is disposed to guide all vehicles arriving from the station B onto the track 7 of the double track section or passing siding but will permit vehicles from either track of the double track section to enter the single track 15.

An electrically operated tongue switch 17 is disposed in the track 6 of the double track section adjacent the switch 16. A vehicle operated electric contact 18 is disposed in the single track 15 at the station B and is adapted to control the electrically operable switch 16 to its open position to shunt vehicles from the track 6 of the double track section onto a safety spur track 19 and prevent the vehicle advancing onto the single track 16 toward the station B until the vehicle arriving on the single track 15 from the station B has entered the track 7 of the double track section.

A second vehicle operated electric contact 20 is disposed on the track 7 of the double track section and is adapted to control the electrically operable switch 17 to its closed position, after the vehicle has entered the track 7 of the double track section or passing siding, so that a vehicle on the track 6 of the passing siding may progress from the siding onto the single track 15 toward the station B.

Torpedoes 33 are disposed on the safety spur tracks at any desired location in proximity to the electrically controlled switches so that a motorman entering the safety spur track will have ample warning of his position so that he may bring his train to a timely stop.

By referring again to Figure 1, it will be seen that a vehicle operated electric contact 2 is disposed on the single track 5 near the switch 8. The purpose of this contact is to permit the vehicle to automatically control the electrically controlled switch 3 of the double track sections constituting a passing siding at the station A so that a train attempting to leave the siding will be shunted onto the safety spur track 4 and cannot proceed while a train is approaching the station A along the single track after leaving the passing siding track 7 above described.

The vehicle operated electric contacts above described are conventional contactors, best shown at 21 in Figure 2, the same being mounted on the trolley line 23 and comprising an insulating block 24 having fixed thereto metal angular bars 25, one of which is connected to the trolley line by a jumper 26. The trolley wheel 27 cross connects both bars. As is usual and well known when the motorman is drifting through the contactor without current on his car or train there is not sufficient current to energize the electro-magnet 28 of the electrically operated switch control mechanism so that the current will, as shown diagrammatically in Figure 4, pass through the armature 29 and energize the solenoid 30 of the shift mechanism 31 of the electrically operated switch to control the switch as above described.

When the motorman is pulling through, however, there is sufficient current passing through the electro-magnet 28 to attract the armature 29 whereupon the current passes from the armature to the opposite solenoid 32 which throws the shift mechanism 31 in the opposite direction, thus permitting the motorman, himself, to selectively control the open or closed position of the electrically operated switch 11. This is, of course, also true of the electrically operated switch 17. The contactor and circuit wiring therefor, for permitting selective control of the electrically operated switches, by the motorman, are conventional.

What is claimed is:

1. In combination, a section of single track joining two double track sections, a switch at one end of the single track section adapted to guide all vehicles from the single track section onto one track of the adjacent double track section but permitting vehicles from either track of the said double track section to enter the single track section, an electrically operable switch in the other track of the said double track section adjacent the first named switch, a vehicle operated electric contact adjacent the other end of the single track section adapted to control said electrically operable switch to its open position to shunt vehicles from said single track section, and a second electric contact operable by a vehicle on said one track adapted to control said electrically operable switch to its closed position.

2. The combination set forth in claim 1 and a safety spur track extending from said electrically operable switch.

3. The combination set forth in claim 1 wherein one or both of the double track sections are passing sidings.

4. In combination with the switches and the control means therefor set forth in claim 1 wherein said structure is duplicated at the other end of the single track section.

5. The combination set forth in claim 1 wherein said vehicle operated electric contacts are selectively operable by the vehicle operator as the vehicle passes thereover.

HENSON W. POYNTER.